United States Patent Office

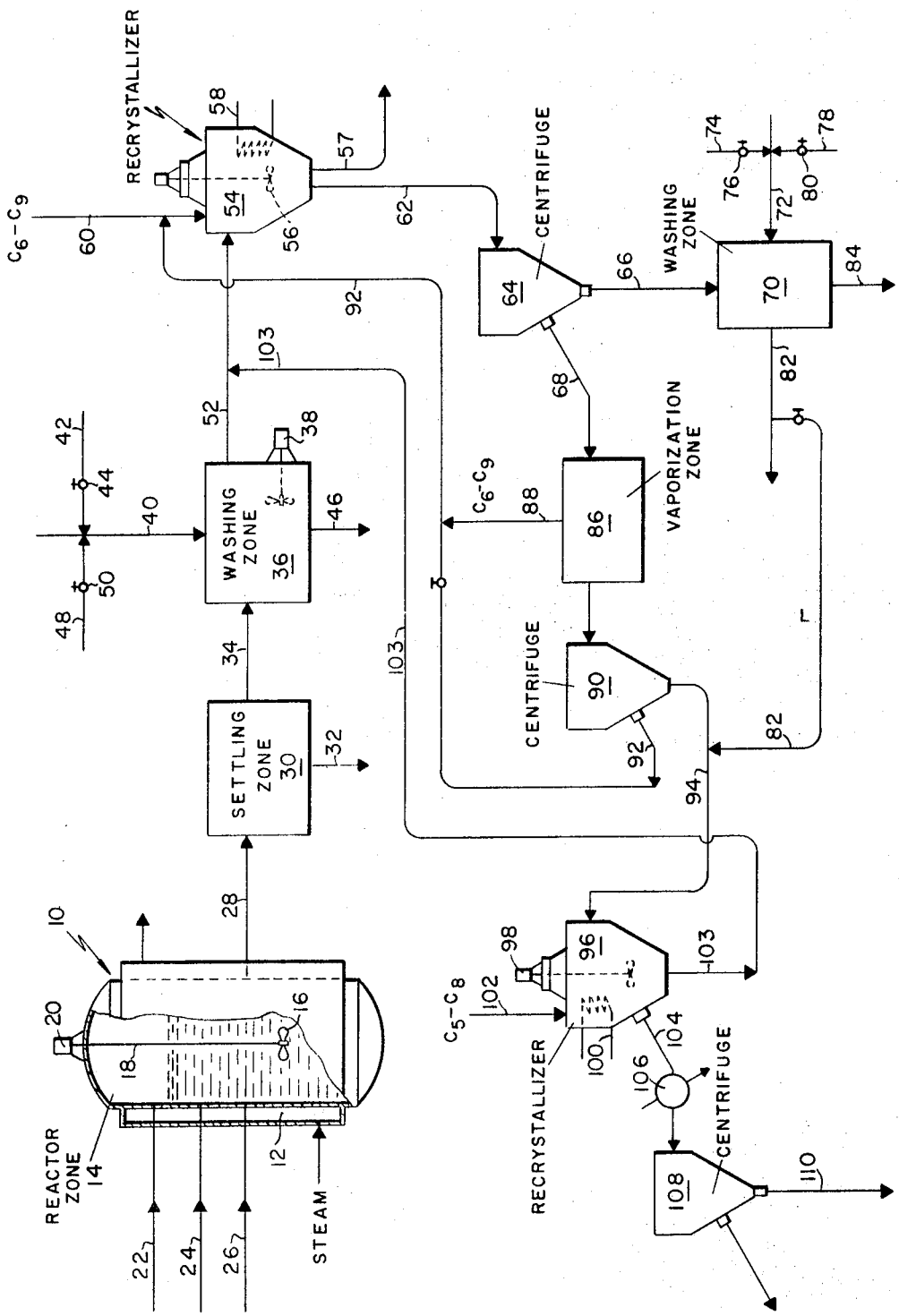

3,652,689
Patented Mar. 28, 1972

3,652,689
PROCESS FOR SEPARATING MONO-CHLORO-METHYLATION AND DI-CHLOROMETHYL-ATION PRODUCT OF A $C_{10}$ OR LOWER AROMATIC HYDROCARBON
Harry E. Cier and Hulen L. Wilder, Baytown, Tex., assignors to Esso Research and Engineering Company
Filed May 2, 1968, Ser. No. 726,053
Int. Cl. C07c 25/14
U.S. Cl. 200—651 R                    6 Claims

ABSTRACT OF THE DISCLOSURE

A process for separating the mono-chloromethylation from the di-chloromethylation products of aromatic hydrocarbons of $C_{10}$ or lower whose mono-chloromethylation products have a melting point of about 25° C. or higher. A chloromethylation reaction mixture is heated with a $C_6$ to $C_9$ aromatic hydrocarbon in the liquid phase to dissolve the mono-chloromethylation and di-chloromethylation products and is then cooled to precipitate solid di-chloromethylation product. Solid di-chloromethylation product is separated from the aromatic hydrocarbon solution and washed with a $C_5$ to $C_8$ saturated hydrocarbon in the liquid phase to high purity. The aromatic hydrocarbon solution is vaporized to leave a residue including the mono-chloromethylated product. The residue is heated with a saturated $C_5$ to $C_8$ hydrocarbon in the liquid phase to dissolve mono-chloromethylated product therein. Then the hot saturated hydrocarbon is separated from undissolved solids and is cooled to precipitate solid mono-chloromethylated product, which is then recovered from the saturated hydrocarbon.

BACKGROUND OF THE INVENTION

Field of the invention

The present invention is directed to the separation of mono-chloromethylation from di-chloromethylation products of $C_{10}$ or lower aromatic hydrocarbons whose mono-chloromethylation products have a melting point of about 25° C. or higher. More particularly, it relates to the separation and recovery in high purity of such mono-chloromethylation and di-chloromethylation products from chloromethylation reaction mixtures and from each other by the use of selective solvents under chosen conditions. In its more specific aspects, aromatic $C_6$ to $C_9$ hydrocarbons and $C_5$ to $C_8$ saturated hydrocarbons in the liquid phase are utilized as solvents.

Description of the prior art

It is known that $C_6$ to $C_{10}$ aromatic hydrocarbons may be converted into chloromethyl derivatives thereof by reaction with hydrochloric acid and formaldehyde in the presence of acidic metal halide chloromethylation catalysts such as zinc chloride, stannic chloride, boron trichloride, antimony pentachloride, and the like. Many of the normal reaction products of chloromethylation, for example, mono-chloromethyldurene and bis-chloromethyldurene, are comparatively high melting solids that are separated from each other at the end of the reaction only with difficulty, and then only in low purity. While solvent extraction process techniques are known for various other chemical products, because the aforesaid mono-chloromethylated and di-chloromethylated products are very useful chemicals, it is quite important that a method of separating them in high purity be provided.

Specific prior art considered in connection with the application on this invention includes U.S. Pats. 3,293,288, 3,004,078, and 2,966,523.

SUMMARY OF THE INVENTION

The present invention may be briefly described as a method of separating the mono- and di-chloromethylation products of $C_{10}$ or lower aromatic hydrocarbons whose mono-chloromethylation products have a melting point of about 25° C. or higher by admixing a chloromethylation reaction mixture containing them with a solvent selected from a first group consisting of $C_6$ to $C_9$ aromatic hydrocarbons, or from a second group consisting of $C_5$ to $C_8$ saturated hydrocarbons, under conditions chosen whereby either the mono-chloromethylation or the di-chloromethylation product will go into solution in the solvent while the other is a solid. Thereafter, the solution is separated from the solid chloromethylation product, and the dissolved chloromethylation product is separated from the solution.

In a particular aspect, a second group solvent, such as cyclohexane, is employed, and the di-chloromethylation product is the chloromethylation product in the solid phase. The solid chloromethylation product is mixed with a $C_6$ to $C_9$ aromatic hydrocarbon under conditions chosen to permit the di-chloromethylation product to dissolve therein to form a solution containing the di-chloromethylation product, after which the di-chloromethylation product is crystallized from such solution and the crystallized di-chloromethylation product is separated therefrom.

In another particular, a first group solvent, for example, toluene, is utilized and the dissolved chloromethylation product is the mono-chloromethylation product. The dissolved chloromethylation product, after separation from the first group solvent, is mixed with a $C_5$ to $C_8$ saturated hydrocarbon under conditions selected to permit the mono-chloromethylation product to dissolve therein to form a solution containing the mono-chloromethylation product. Thereafter, the hydrocarbon solution is separated from the chloromethylation product solids not dissolved in the hydrocarbon solvent, and the mono-chloromethylation product is separated from the hydrocarbon solvent under conditions selected to recover therefrom the solid chloromethylation product.

BRIEF DESCRIPTION OF THE DRAWING

The single figure of the accompanying drawing is a flow diagram which schematically illustrates a preferred mode of the present invention.

DESCRIPTION OF THE PREFERRED EMBODIMENT

A more complete understanding of the present invention and a fuller appreciation of the advantages thereof may be gained from the following description of a preferred mode of employing the invention on the $C_{10}$ aromatic hydrocarbon durene. The description is advantageously read in conjunction with the accompanying drawing which illustrates an embodiment for practicing the present invention to separate mono-chloromethyl-durene from bis-chloromethyldurene.

Referring now to the drawing, reference numeral 10 designates a tubular reactor provided with a steam jacket 12 about a reaction zone 14, into which there protrudes an agitating or propelling means 16 on driving shaft 18 driven by power means 20. Introduced into the reaction zone 14 by way of line 22 is a suitable aromatic hydrocarbon, such as durene, from a source not shown. Incoming by way of lines 24 and 26 are aqueous solutions of hydrogen chloride and formaldehyde. An acidic metal halide chloromethylation catalyst, such as zinc chloride, may be added, if desired, in solution in the hydrochloric acid by way of hydrochloric acid charge line 26. In the reaction zone 14, solid chloromethylation products melting within the range of about 25° to 220° C. are formed.

During the formation of the chloromethylation products, the tubular reaction zone 14 is under pressure sufficient to maintain a liquid phase at the reaction temperature of from 85° to 99° C. This pressure may be in the range of from 0 to about 100 p.s.i.g., but preferably is maintained at about 40 p.s.i.g. The mixture is held at the aforesaid reaction temperatures for about three hours, stirring being maintained throughout the reaction period to provide complete reaction. Anhydrous hydrogen chloride may be added through line 26 during the reaction to hold the acidity of the aqueous reacting phase up to about 30% HCl.

At the end of the reaction period, the reactor 14 is cooled and a discharge stream is drawn therefrom through line 28 into settling zone 30, wherein the stream is separated into an aqueous phase and a hydrocarbon phase comprising chloromethylated products, unreacted feed, and by-products. The aqueous phase, which may comprise water from hydrochloric acid, catalysts, and the like, is removed by way of line 32 for further treatment, as desired (not shown). The chloromethylated solids are withdrawn from the settling zone 30 by line 34 into a washing zone 36 which is provided with a suitable agitator 38. The solids are water washed with a plurality of water washings introduced by way of ilne 40 from branch line 42 controlled by valve 44, the wash being drained from the washing zone 36 by way of line 46. Following this, an aqueous solution of sodium carbonate is flowed through washing zone 36 from branch line 48 controlled by valve 50 by way of line 40 to cause the solids in the washing zone to have a neutral or slightly alkaline pH.

The chloromethylation solids are then withdrawn from washing zone 36 by way of line 52 into recrystallizer 54, which is provided with a suitable means of agitation such as impeller 56 and suitable cooling means such as cooling coil 58. In accordance with the present invention, a $C_6$ to $C_9$ aromatic hydrocarbon solvent such as benzene, toluene, xylenes, ethylbenzene, mesitylene, pseudocumene, hemimellitine, ethyltoluenes, or normal or iso-propylbenzene, or a mixture thereof, but preferably toluene, which is refluxed at a temperature of about 100° C. to about 150° C. under pressures of from about 14.7 to about 100 p.s.i.g., is introduced into recrystallizer 54 by way of line 60 and agitation is maintained by means 56 to bring the chloromethylation solids into a slurry. For simplicity of description, further reference to $C_6$ to $C_9$ aromatic hydrocarbons will principally be in terms of the preferred toluene. It is to be understood that the indicated $C_6$ to $C_9$ aromatic hydrocarbons may be employed in the same manner as toluene, within the skill of the art.

The slurry is maintained at the refluxing temperature for a period sufficient to permit substantially complete dissolution of the bis-chloromethyldurene from the chloromethylation solids into the toluene. Trischloromethyl-aromatic, which may be present in small quantities, does not dissolve in the hot toluene and is withdrawn by line 57. Thereafter, the slurry is cooled by means of cooling coil 58 to a temperature of about 60° C. to effect precipitation from solution of dissolved bis-chloromethyldurene. Mono-chloromethyldurene remains dissolved in the toluene.

The slurry is then withdrawn from recrystallizer 54 by way of line 62 into centrifuge 64 whereby a cake of crude bis-chloromethyldurene may be recovered by line 66. The toluene filtrate is recovered by line 68 and purified, as hereinafter described.

The crude bis-chloromethyldurene cake is carried from line 66 to washing zone 70 for purification. A plurality of hot cyclohexane washes are introduced into washing zone 70 by line 72 from branch line 74 and control valve 76. An additional wash solution of 75% cyclohexane and 25% acetone is introduced through line 72 from branch line 78 through valve 80 as a final washing step. The wash from washing zone 70 is recovered by line 82 for further treatment, as desired, such as by recycling to line 94. Solid bis-chloromethyldurene of high purity is recovered from washing zone 70 by line 84.

Mono-chloromethyldurene, which is dissolved in the toluene filtrate recovered from centrifuge 64 by line 68, is carried to vaporization zone 86 where a large amount of the toluene is evaporated and passed from vaporization zone 86 to leave a high solids content slurry which is passed from zone 86 to centrifuge 90 to remove the small amount of toluene remaining therewith. The toluene may be recycled, such as by line 92, for reuse as desired.

The slurry solids are recovered from centrifuge 90 by line 94 and introduced into recrystallizer or mixing tank 96, which is fitted with a stirrer 98. Mixing tank 96 is also provided with a heat exchange coil 100 to control the temperature of the slurry solids therein. A $C_5$ to $C_8$ saturated hydrocarbon selected from the group consisting of $C_5$–$C_8$ paraffins, such as the pentanes, hexanes, heptanes, or octanes, and the $C_5$–$C_8$ naphthenes, such as cyclopentane, methylcyclopentane, cyclohexane, methylcyclohexane, or a mixture thereof, but preferably cyclohexane, is introduced into mixing tank 96 by line 102, and the solids from line 94 are slurried therewith under agitation by stirrer 98. Hereinafter, the preferred cyclohexane is employed for brevity of description, but it will be understood that any one or more of the aforesaid $C_5$–$C_8$ saturated hydrocarbons may be used instead, making only such changes in operating conditions within ordinary skill as are imposed by the use of that particular hydrocarbon or hydrocarbon mixture.

The slurried mixture in tank 96 is brought to a temperature approximately corresponding to the boiling point of the solution. The amount of cyclohexane introduced into mixing tank 96 is controlled so that excess solids remain in the vessel at the temperature employed. While the mixture is still near the boiling point, the clear, natant liquid is removed from mixing tank 96 by line 104. Additional cyclohexane is introduced into mixing tank 96 by line 102 in amounts that permit excess solids to remain in the vessel as the temperature of the mixture in the mixing tank is raised to a level at or near its boiling point and, again, the clear, supernatant liquid is removed from tank 96 while the mixture is near the boiling point. This is repeated until no more of the solids in the tank go into cyclohexane solution. Undissolved solids are recycled, as desired, to input line 60 by line 103.

The hot cyclohexane solutions withdrawn by line 104 are composited and cooled by heat exchange means 106 to about 10–25° C., at which temperature a heavy slurry forms. The slurry is then carried from heat exchange means 106 to centrifuge 108, from which a substantially pure mono-chloromethyldurene cake is recovered by line 110.

Further details of the practice of the present invention are illustrated in the following examples in which all parts and percentages are by weight unless otherwise indicated.

EXAMPLE I

One pound-mol of 95% purity durene was reacted in a 100-gallon glass-lined Pfaudler reactor with 4.5 pounds-mols of hydrochloric acid, 2.7 pounds-mols of paraformaldehyde, and 0.3 pound-mol of zinc chloride catalyst. Before starting the reaction, 109 pounds of hydrochloric acid was added as a 32% aqueous solution. The reactor was then heated to a temperature of from 88° to 90° C. at a pressure of 40 p.s.i.g. to start the reaction, and the reaction was allowed to proceed for three hours with stirring. During this time the remaining 55 pounds of hydrochloric acid was added as an anhydrous gas in order to hold the hydrochloric acid level of the aqueous reacting phase at about 30%. At the end of three hours the reactor was cooled and settled, and the aqueous phase withdrawn. The solids were water-washed twice and an excess of sodium carbonate in an aqueous solution was added to raise the pH to pH 7 or to a slightly alkaline level, after which the solids were drained and fluxed with 15 gallons of hot toluene and centrifuged at room temperature. One hundred and fifty pounds of crude solids were recovered with an approximate composition of 51% bis-chloromethyldurene, 34% mono-chloromethyldurene, and 15% water toluene. The centrifuge cake was purified by three hot cyclohexane washes and a final wash with a solution of hot 25% acetone and 75% cyclohexane to yield a solid bis-chloromethyldurene of approximately 99 weight percent purity according to gas phase chromatography analysis. Nuclear magnetic resonance, chromatographic, and melting point studies indicated a purity of 97–98%.

Solids from the evaporated centrifuge filtrate were put into cyclohexane solution and the mixture was brought to a boil. The relative amounts of solids and cyclohexane were such that excess solids remained in the vessel during boiling. While the material was still near the boiling point, the clear, natant liquid was decanted. This step was repeated until no more of the solids in the vessel would go into cyclohexane solution. The hot cyclohexane solutions were composited and cooled to about 10°–25° C. A heavy slurry formed and was centrifuged. The mono-chloromethyldurene recovered as a solid from the centrifuge was found to be 90–93% pure.

EXAMPLE II

Chloromethylation reaction products prepared as in Example I are washed and neutralized as in Example I. Several volumes of hot cyclohexane are added to the chloromethylation solids and heated therewith at temperatures approaching the boiling point of the solution to produce a saturated solution containing mono-chloromethyldurene. The mixture is then centrifuged while near the boiling point to separate a solid cake of crude bis-chloromethyldurene from the hot cyclohexane filtrate, which is treated as hereinafter described. The solid cake is introduced into a recrystallizer and reslurried with hot toluene for intimate contact therewith at a temperature greater than about 100° C., to cause bis-chloromethyldurene to go into solution. The slurry-solution is then cooled to precipitate bis-chloromethyldurene crystals, and the slurry is centrifuged to separate solid bis-chloromethyldurene therefrom. The cake recovered from the centrifuge contains bis-chloromethyldurene of high purity, on the order of about 97%.

The aforesaid hot cyclohexane filtrate recovered from the first centrifuging step is cooled to about 10°–25° C. to precipitate dissolved mono-chloromethyldurene therefrom, and the separated mono-chloromethyldurene is then centrifuged, whereby a solid cake of mono-chloromethyldurene of high purity is obtained.

From the foregoing it can be seen that monochloromethyldurene can be separated from bis-chloromethyldurene, in accordance with the present invention, by employing the indicated solvent separations and liquid-solid separations in either one of two sequences. In one sequence the washed, neutralized chloromethylation products are mixed with a hot $C_5$–$C_8$ saturated hydrocarbon to dissolve mono-chloromethyldurene, but not bis-chloromethyldurene, which remains insoluble therein. The mixture is subjected to a liquid-solid separation while still hot to separate solid bis-chloromethyldurene from dissolved mono-chloromethyldurene, which is then cooled to precipitate it from solution and is separated from the solution by a liquid-solid separation. Thereafter, the bis-chloromethyldurene is purified by recrystallization, followed by a liquid-solid separation to recover it. In the other sequence the washed, neutralized chloromethylation products are mixed with a $C_6$–$C_9$ aromatic hydrocarbon and the mixture is recrystallized and subjected to a liquid-solid separation. The bis-chloromethyldurene, which is insoluble in such hydrocarbon except at raised temperatures, is thus separated from mono-chloromethyldurene, which is soluble in such hydrocarbon at both normal and raised temperatures. The mono-chloromethyldurene is separated from the hydrocarbon by vaporization. It may then be purified by contacting it with a hot $C_5$–$C_8$ saturated hydrocarbon to dissolve it therein, but not other insoluble chloromethylation products, such as any bis-chloromethyldurene. The saturated hydrocarbon is then subjected to a liquid solid separation while still hot to separate any undissolved solids from the dissolved mono-chloromethyldurene, and the hydrocarbon is cooled to precipitate mono-chloromethyldurene, which is recovered from the hydrocarbon by a liquid-solid separation.

By employing the process used to separate mono- from bis-chloromethyldurene, one can similarly separate the mono- and di-chloromethylation products of lower aromatic hydrocarbons whose mono-chloromethylation products have a melting pint of 25° C. or higher. Thus, for example, the mono-chloromethylation products of such aromatic hydrocarbons as the xylenes, ethyltoluenes, ethylbenzene, propylbenzenes, and so forth, can be separated from the di-chloromethylated products thereof. Obviously, moreover, the particularly solvent-separation or liquid-solid technique can be other than the recrystallization and centrifuge methods described, from a simple decanting to filters and the like. All such methods as applied to the aforesaid $C_{10}$ or lower aromatic hydrocarbons are contemplated, the described methods and the particular $C_{10}$ hydrocarbon used herein being employed only for purposes of illustration to present a preferred mode.

Having fully described the best modes and embodiments of the present invention, it is to be understood that the present invention is not limited to the specific details set forth, but is of the full scope of the appended claims.

What is claimed is:

1. In the separation of products obtained by the chloromethylation of an aromatic hydrocarbon having no more than 10 carbon atoms, whose monochloromethylation products have a melting point of not less than about 25° C., wherein at least one mono-chloromethyl derivative of said aromatic hydrocarbon is obtained as a monochloromethylation product and at least one dichloromethyl derivative of said aromatic hydrocarbon is obtained as a di-chloromethylation product, the process comprising the sequential steps of:

(a) heating a mixture comprised of said monochloromethylation and di-chloromethylation products in a $C_6$–$C_9$ aromatic hydrocarbon solvent in the liquid phase to a temperature near the boiling point thereof at a pressure of from about 14.7 to about 100 p.s.i.g. to dissolve said mono-chloromethylation and said di-chloromethylation products therein, and thereafter cooling said mixture to a temperature of no more than about 60° C. effective to precipitate the di-chloromethylation product, but not the mono-chloromethylation product, from solution in solid phase, said mono-chloromethylation products remaining in solution;

(b) separating said solution from said solid dichloromethylation product;

(c) separating said mono-chloromethylation product from said solution;

(d) heating said mono-chloromethylation product with a $C_5$–$C_8$ saturated hydrocarbon solvent in the liquid phase to a temperature approximately corresponding to the boiling point of the solution thereof, whereby said monochloromethylation products will dissolve in said saturated hydrocarbon to form a second solution;

(e) separating said second solution from any undissolved solids;

(f) cooling said second solution whereby said mono-chloromethylation products will precipitate as a solid; and (g) separating said mono-chloromethylation products from said second solution.

2. The method of claim 1 in which said $C_6$–$C_9$ aromatic hydrocarbon solvent is selected from benzene, toluene, xylenes, ethylbenzene, mesitylene, pseudocumene, hemimellitine, ethyltoluenes, n-propylbenzene, isopropylbenzene, or a mixture thereof, and said $C_5$–$C_8$ saturated hydrocarbon solvent is selected from pentanes, hexanes, heptanes, octanes, cyclopentane, cyclohexane, methylcyclopentane, and methylcyclohexane, or a mixture thereof.

3. A method in accordance with claim 1 wherein said $C_6$–$C_9$ aromatic hydrocarbon solvent is toluene.

4. A method in accordance with claim 1 wherein said $C_5$–$C_8$ saturated hydrocarbon solvent is cyclohexane.

5. A method in accordance with claim 1 wherein said mono-chloromethylation product is monochloromethyldurene and said di-chloromethylation product is bis-chloromethyldurene.

6. A process for separating the monochloromethylation and di-chloromethylation products obtained by the chloromethylation of durene comprising the sequential steps of:
(a) heating a mixture comprised of said chloromethylation products in toluene in the liquid phase to a temperature near the boiling point thereof under pressures from about 14.7 to about 100 p.s.i.g. to dissolve mono-chloromethyldurene and di-chloromethyldurene therein, and thereafter cooling said mixture to a temperature of about 60° C. to effect precipitation from solution of the di-chloromethyldurene, but not the mono-chloromethyldurene, which remains in solution;
(b) separating said solution from said solid di-chloromethyldurene;
(c) separating said mono-chloromethyldurene from said solution;
(d) heating said mono-chloromethyldurene with cyclohexane in the liquid phase to a temperature approximately corresponding to the boiling point thereof, whereby said mono-chloromethyldurene dissolves in said cyclohexane to form a second solution;
(e) separating said second solution from any undissolved solids;
(f) cooling said second solution whereby the mono-chloromethyldurene precipitates as a solid; and
(g) separating the mono-chloromethyldurene from said second solution.

References Cited
UNITED STATES PATENTS

| | | | |
|---|---|---|---|
| 2,966,523 | 12/1960 | Depierri et al. | 260—651 HA |
| 3,293,288 | 12/1966 | Cier et al. | 260—525 |

DANIEL D. HORWITZ, Primary Examiner